UNITED STATES PATENT OFFICE.

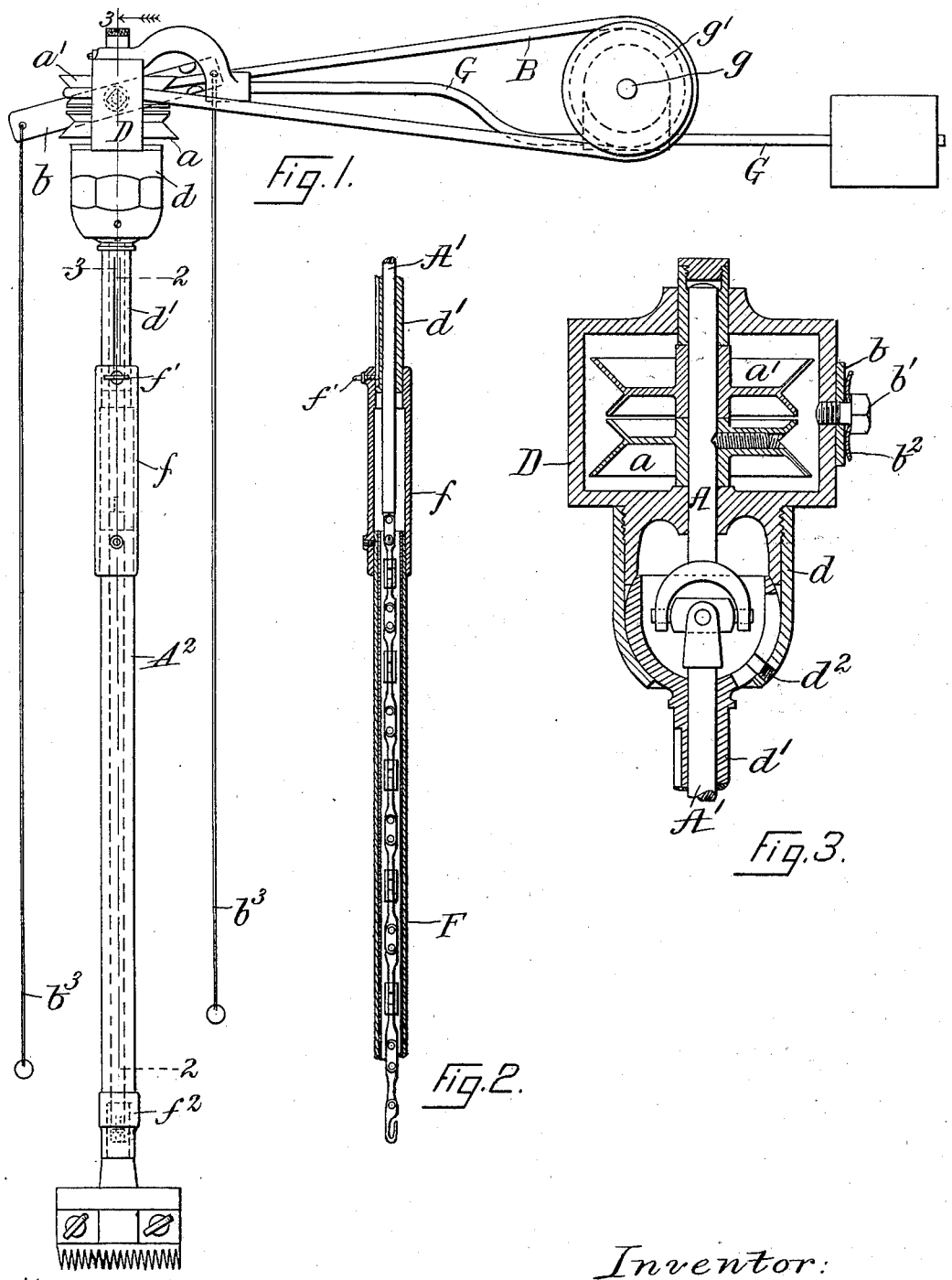

JOSEPH K. PRIEST, OF NASHUA, NEW HAMPSHIRE, ASSIGNOR TO THE AMERICAN SHEARER MANUFACTURING COMPANY, OF SAME PLACE.

MECHANISM FOR TRANSMITTING POWER.

SPECIFICATION forming part of Letters Patent No. 627,202, dated June 20, 1899.

Application filed January 23, 1899. Serial No. 703,072. (No model.)

*To all whom it may concern:*

Be it known that I, JOSEPH K. PRIEST, of Nashua, in the county of Hillsborough and State of New Hampshire, have invented an Improved Mechanism for Transmitting Power, of which the following is a specification, reference being had to the accompanying drawings, in which—

Figure 1 is a side elevation of my improved mechanism. Fig. 2 is a section on line 2 2 of Fig. 1; and Fig. 3 is a section on line 3 3 of Fig. 1, enlarged for clearness.

My invention is especially adapted for use in transmitting power through a flexible shaft, and in its best form consists of a shaft one part A of which carries a fast pulley $a$ and a loose pulley $a'$, so that by shifting belt B to the fast pulley $a'$ by means of the shipper $b$ shaft A may be started. Shaft A is connected by a universal joint to shaft A' in a well-known manner, and the shaft composed of the two parts A and A' is carried by bracket D, socket $d$, and the sleeve $d'$, with a hollow ball at one end to fit in the socket $d$. The ball on sleeve $d'$ is slotted, as shown in Fig. 3, and a pin $d^2$, fast to socket $d$, engages that slot and prevents sleeve $d$ from revolving with shaft A A', but yet allows a universal motion of part A' with relation to part A.

The sheath F of the flexible shaft $A^2$ is fitted at one end with sleeve $f$, which is connected to sleeve $d'$ by a pin $f'$ through sleeve $f$ entering a slot in sleeve $d'$, so that sleeve $f$ can be moved endwise on sleeve $d'$. At the other end of sheath $f$ is the sleeve $f^2$, in which the shank of the tool or instrument driven by the flexible shaft $A^2$ revolves.

The belt-shipper $b$ is a lever connected to bracket D by a screw $b'$ and a friction-washer $b^2$, so that when lever $b$ is moved by a pull on one or the other of the cords $b^3$ (or otherwise moved) it will be held by friction in the proper place.

Bracket D is attached to one end of the balanced arm G, which is pivotally secured to a fixed bracket, (not shown,) thereby allowing the bracket D to be moved in a circle about the pulley $g'$, which is mounted on shaft $g$, driven by power, the pulley $g'$ being connected to pulleys $a\ a'$ by a belt B.

The main feature of novelty is the combination of a driving-shaft and its pulley with a balanced arm, and a bracket fast to that arm carrying a shaft with tight and loose pulleys, and a belt-shipper, so that the belt of the driving-pulley can be shifted to either pulley on the driven shaft carried by the bracket.

Another feature of my invention is the combination of a driving-shaft with a balanced arm, and a bracket fast on that arm carrying a shaft and also carrying means for connecting and disconnecting that shaft with the driving-shaft.

These features of my invention are especially applicable to a shaft composed of a flexible shaft connected to the fast and loose pulleys by two rigid shafts, which are connected by a gimbal-joint, and enveloped for a greater part of its length in a sheath which must be moved endwise on the flexible shaft and also on that one of the two rigid shafts which is directly connected to the flexible shaft.

What I claim as my invention is—

1. In combination, a driving-shaft; a driving-pulley on that shaft, a balanced arm oscillating on the driving-shaft, a bracket on that arm; a driven shaft carried by that bracket; tight and loose pulleys, on that driven shaft, a belt-shipper; and a belt from the driving-pulley to the tight and loose pulleys and controlled by the shipper, all substantially as described.

2. In combination a driving-shaft; a balanced arm oscillating about the driving-shaft; a bracket on that arm; a driven shaft carried by that bracket; and means carried by the bracket for connecting and disconnecting the driving-shaft and the driven shaft all substantially as described.

3. In combination driving-shaft $g$, pulley $g'$ arm G, bracket D, shafts A A' $A^2$, tight pulley $a$ and loose pulley $a'$ both on shaft A, belt B, socket $d$, slotted ball and sleeve $d'$ and sheath F $f f'$, all substantially as described.

4. In combination driving-shaft $g$, pulley $g'$ arm G, bracket D, shafts A A' $A^2$, and tight pulley $a$ on shaft A, belt B, socket $d$, slotted ball and sleeve $d'$ and sheath F $f f'$, all substantially as described.

JOSEPH K. PRIEST.

Witnesses:
E. E. PARKER,
G. F. DROWN.